United States Patent Office 2,835,610
Patented May 20, 1958

2,835,610

PROCESS FOR THE PREPARATION OF A CONVERSION PRODUCT OF THE HIGHER CARBOHYDRATES AND CARBOHYDRATE ETHERS

Heinrich Dohmen, Deventer, Netherlands, assignor to N. V. Eldeka, The Hague, Netherlands, a limited-liability company of the Netherlands No Drawing. Application January 17, 1955
Serial No. 482,400

Claims priority, application Netherlands January 19, 1954

4 Claims. (Cl. 127—36)

According to the present invention conversion products of the higher carbohydrates and carbohydrate ethers are prepared by treating a higher carbohydrate or an ether thereof, or a mixture of these substances, with a dilute aqueous solution of an organic carboxylic acid. During the conversion the acid and the water are bound entirely or partially whilst a gas with a stinging odor is liberated.

As the starting material for the conversion starch, particularly potato starch and dextrin are preferred. The starch may be subjected to the action of the acid in a highly concentrated aqueous solution or suspension and is converted to a very thick, sticky and tough mass which possesses properties which render it suitable for various technical applications. The conversion may be carried out with the aid of acetic acid which may be used in the commercially available concentration, namely 80%. The starch may also be treated, however, in a dilute solution. When the starting material has an acid reaction the acid should be neutralized with an alkali before the conversion is started.

The nature of the conversion is entirely different from the known conversion of carbohydrates with the aid of inorganic strong acids, in which the final product is glucose. The final product of the present conversion does not give a positive reaction on glucose with Fehling's solution.

A theoretical explanation of the present conversion has not been found; as appears from the negative reaction to Fehling's solution no complete decomposition of the carbohydrate molecule takes place, but the circumstances during the reaction are not suitable for the formation of esters of the carbohydrate with the carboxylic acid either. The present conversion is interesting on account of the properties of the products obtained.

Another preferred starting material is Tylose (a brand name for cellulose ethers, such as for example methylcellulose and carboxymethyl cellulose).

Very interesting products are obtained with dextrin as a starting material. Although the conversion takes place slowly at normal temperature, it may be accelerated by increasing the temperature. It has been observed, however, that heating of the solution over approximately 60° C. should be avoided when converting Tylose, since otherwise the formation of lumps occurs which can be dissolved with very much trouble only, unless e. g. a quarter of the amount of acid totally required is added first while stirring at approximately 90° C. In the latter case the solution may be heated even at boiling temperature, without the solution becoming turbid or lumps being formed either.

When Tylose is used the acid may be added to the water before the Tylose is dissolved therein, but the acid may also be added to the aqueous Tylose solution after the preparation of the solution has been completed. It takes some time before the Tylose has been completely dissolved.

Any organic carboxylic acid in aqueous solution may be used for effecting the conversion. Besides the acetic acid already mentioned also oxalic acid, propionic acid, butyric acid, tartaric acid and citric acid may be used.

The final product of the conversion may be obtained in solid condition by drying, preferably under the exclusion of air. In this manner a powder may be obtained, which on dissolving in water which has been acidified with the organic acid gives a solution which has the same properties as the original liquid product.

The minimum proportion of acid which is to be added to obtain the conversion product depends on the nature of the starting material used. When using dextrin at least ½ ml. of 80% acetic acid is necessary per gram of dextrin.

When more acid is used than is required for the conversion this has no adverse results for the conversion, but, if desired, the unreacted acid may be neutralized with the aid of alkali. In practice, when dextrin is started from a maximum proportion of approximately 5 ml. of 80% aqueous acetic acid per gram of dextrin is used. For Tylose these minimum and maximum proportions are approximately ¼ and 2½ ml. of 80% aqueous acetic acid per gram of Tylose.

The properties of the conversion product render it suitable for a great number of technical applications. The adherence of the final product renders it suitable as a raw material for gluing e. g. paper. The solution is also excellently suitable as a binding agent for moulding moulded articles from fibre material, such as wood fibres, saw dust, shavings and the like wood waste. Wood fibreboard of excellent quality is obtained thereby.

A very interesting and moreover surprising property is that the product is able to dry at the air, whereby it hardens to a water-insoluble material. This conversion takes place under cooperation with the oxygen in the air and is accelerated by increase of the temperature, but it also proceeds at normal temperature, though slowly.

The properties of objects, the surface of which has been treated with the liquid conversion product, are improved in many respects after the drying of the conversion product. Thus the strength of fibres is increased by the treatment; it is possible to admix a dyestuff to the solution so that dyeing and strengthening of the fibres is possible in one operation. The shrinkage of textile fibres is decreased after treatment with the solution of the conversion product and the shrinkage may entirely disappear dependent on the concentration of the solution. Textiles may be made more or less water repellent, dependent on the concentration of the solution.

An interesting application is the surface treatment of wood. Wood which has been moistened with the solution and is thereupon dried, shrinks considerably less then untreated wood. Dependent on the concentration of the solution and on the way the solution is applied to the material wood may be made entirely unshrinkable.

The adhesive power of the solution may be applied to the manufacture of briquets from solid substances, particularly solid fuel. In this case hardening at the air exerts a very favorable influence. The solution is suitable as a binding agent for the manufacture of moulded articles from materials which contain silicates such as sand, or from refractory material.

Inorganic and organic acids do not react on the products treated with the solution after the hardening has taken place. Thus concrete tiles e. g. which after moulding have been coated with the solution, become highly acid resistant after hardening and even with silicate-containing material a certain hardening occurs.

Example I 100 g. of dextrin prepared from potato starch were dissolved in 1 l. of water, whereupon the solution was heated whilst 100 ml. of 80% acetic acid were slowly added. During this addition a strongly stinging odor could be observed. After the addition of the acetic acid the conversion had taken place completely. When less acid is added the conversion remains incomplete. When considerably more than 100 ml. of acetic acid are added to the dextrin solution, however, the conversion takes place completely; if desired, the excess of acetic acid may be neutralized by the addition of an alkali.

It appeared that the neutralized solution was very suitable for rendering concrete tiles acid-resistant.

Example II 10 ml. of 80% acetic acid were added to a solution of 10 g. of Tylose in 1 l. of water. The solution was allowed to stand at room temperature during 24 hours. In this time the solid substance had been dissolved and the conversion of the Tylose had taken place completely. If desired, the conversion can also be made to take place at a somewhat elevated temperature. Any acetic acid which is still present at the end of the conversion may be neutralized, if desired, with the aid of alkali.

The thus prepared neutralized solution may be used for rendering wood unshrinkable.

Example III 100 ml. of concentrated propionic acid were added to a solution of 100 g. of potato starch in 1000 ml. of water while stirring, whereupon the solution was ready to be used for binding calcium carbonate-containing substances.

What is claimed is:

1. In a method for preparing a conversion product which is readily oxidizable by air to form a water-insoluble material, the step of reacting in an aqueous solution a member selected from the group consisting of potato starch, dextrin and water-soluble cellulose ether with (1) about 1 ml. of lower aliphatic monocarboxylic acid per gram of potato starch, (2) from about 0.5 to 5.0 ml. of a lower aliphatic monocarboxylic acid per gram of dextrin, and (3) from about 0.25 to 2.5 ml. of lower aliphatic monocarboxylic acid per gram of water-soluble cellulose ether.

2. In a method for preparing a conversion product which is readily oxidizable by air to form a water-insoluble material, the step of reacting potato starch in an aqueous solution with about 1 ml. of lower aliphatic monocarboxylic acid per gram of potato starch.

3. In a method for preparing a conversion product which is readily oxidizable by air to form a water-insoluble material, the step of reacting dextrin in an aqueous solution with from about 0.5 to 5.0 ml. of a lower aliphatic moncarboxylic acid per gram of dextrin.

4. In a method for perparing a conversion product which is readily oxidizable by air to form a water-soluble material, the step of reacting a water-soluble cellulose ether in an aqueous solution with from about 0.25 to 2.5 ml. of a lower aliphatic moncarboxylic acid per gram of the water-soluble cellulose ether.

References Cited in the file of this patent

Rehwald: Starch Making, London, 1926, p. 232.